United States Patent
Ivanov (10) Patent No.: US 8,310,109 B2
(45) Date of Patent: Nov. 13, 2012

(54) POWER MANAGEMENT DC-DC CONVERTER AND METHOD FOR INDUCTION ENERGY HARVESTER

(75) Inventor: Vadim V. Ivanov, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 276 days.

(21) Appl. No.: 12/657,820

(22) Filed: Jan. 28, 2010

(65) Prior Publication Data

US 2011/0181115 A1 Jul. 28, 2011

(51) Int. Cl.
*B23K 11/24* (2006.01)
*H02B 1/24* (2006.01)

(52) U.S. Cl. ......................... 307/112; 363/127

(58) Field of Classification Search .................. 307/80, 307/112; 363/127
See application file for complete search history.

(56) References Cited

U.S. PATENT DOCUMENTS

| | | | |
|---|---|---|---|
| 5,654,880 A | 8/1997 | Brkovic et al. | |
| 5,798,630 A | 8/1998 | Sugimori et al. | |
| 6,020,726 A | 2/2000 | James | |
| 6,275,016 B1 | 8/2001 | Ivanov | 323/224 |
| 2006/0132081 A1 | 6/2006 | Clothier et al. | |
| 2009/0046482 A1 | 2/2009 | Smith | |
| 2010/0165686 A1* | 7/2010 | Matzberger et al. | 363/127 |

OTHER PUBLICATIONS

"Perpetuum Vibration Energy Harvester-Powered Wireless Condition Monitoring Application Note" by John Parker, Perpetuum Ltd., AN001 Issue 1.0, Apr. 9, 2007, 13 pages.
PCT Search Report mailed Jun. 15, 2011.
Perpetuum Vibration Energy Harvester-Powered Wireless Condition Monitoring Application Note, AN001 Issue, Apr. 9, 2007 pp. 1-13 (John Parker).

* cited by examiner

*Primary Examiner* — Carlos Amaya
(74) *Attorney, Agent, or Firm* — William B. Kempler; Wade J. Brady, III; Frederick J. Telecky, Jr.

(57) ABSTRACT

A system for managing AC energy harvested from a harvesting device (1) including a coil (4) including switching circuitry (S1-S4) coupled between first (7A) and second (7B) terminals of the coil. The switching circuitry includes first (S1), second (S2), third (S1), and fourth (S4) switches. A switch controller (17) closes the second and fourth switches to allow build-up of current ($I_{Lh}$) in the coil, opens one of the second and fourth switches, and closes a corresponding one of the third and first switches in response to the built-up inductor current reaching a predetermined threshold value ($I_{hrv}$) to steer the built-up inductor current through the corresponding one of the third and first switches to a current-receiving device (24 and/or $R_L$, $C_L$).

20 Claims, 6 Drawing Sheets

POWER MANAGEMENT DC-DC CONVERTER AND METHOD FOR INDUCTION ENERGY HARVESTER

BACKGROUND OF THE INVENTION

The present invention relates generally to use of induction type energy harvesters along with DC-DC converters, and more particularly to switching circuitry and techniques for using the inductance of the energy harvester both for inductive energy harvesting and for performing DC-DC conversion of the energy harvester output.

Figure 1:
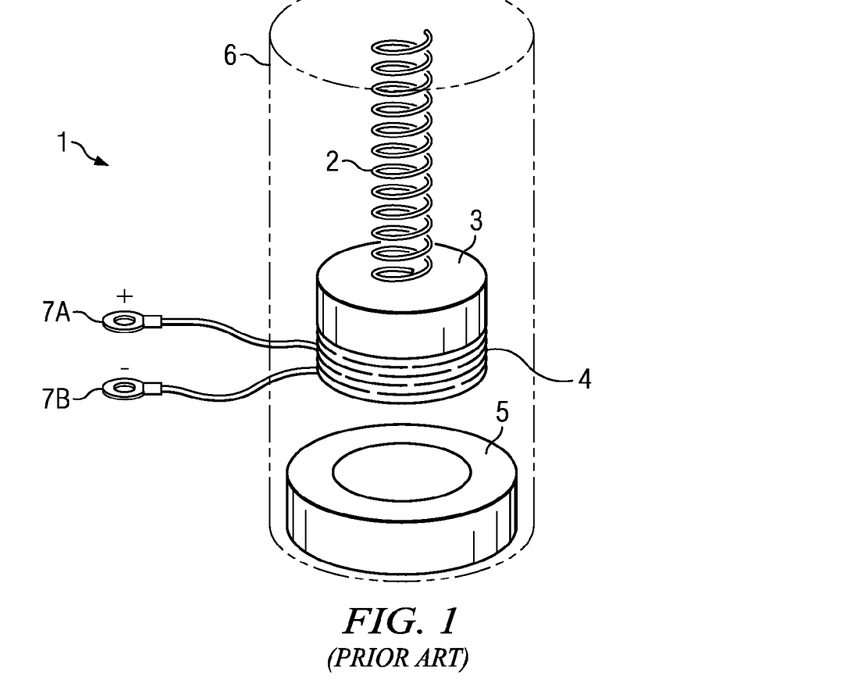
FIG. 1 is a simplified diagram of a conventional inductive vibration energy harvester device.

The basic structure of an induction type vibration energy harvester 1 is shown in FIG. 1. It includes a mass m and associated coil or inductor 4 suspended on one end of a spring 2. The mass m and coil 4 move with velocity v relative to a magnet 5. The other end of spring 2 and magnet 5 are supported by a support 6. (The coil might be stationary with the magnet moving, or vice versa.). When coil 4 and associated mass m move with velocity v in the magnetic field, their kinetic energy $E_k=(mv^2)/2$ is transformed into potential energy in spring 2 which then is converted into electromagnetic energy $E_{Lh}=e_L=(L_h I_{Lh}^2)/2$. The electromotive force $e_L$ in the coil is defined by the velocity v of its movement through the magnetic field, and is given by $e_L=-w \times B \times v$, where w is number of turns of the coil, B is the magnetic field density, and v is the velocity of coil 4 relative to magnet 5. The frequency of this AC current is the frequency of vibration, typically 60 to 120 Hz, and, at the present state-of-the-art, no more than approximately 2000 Hz. More generally, the maximum frequency of the AC current to be harvested will be no more than about 10 times the switching frequency of the switches being utilized in the power management circuitry.

Figure 2:
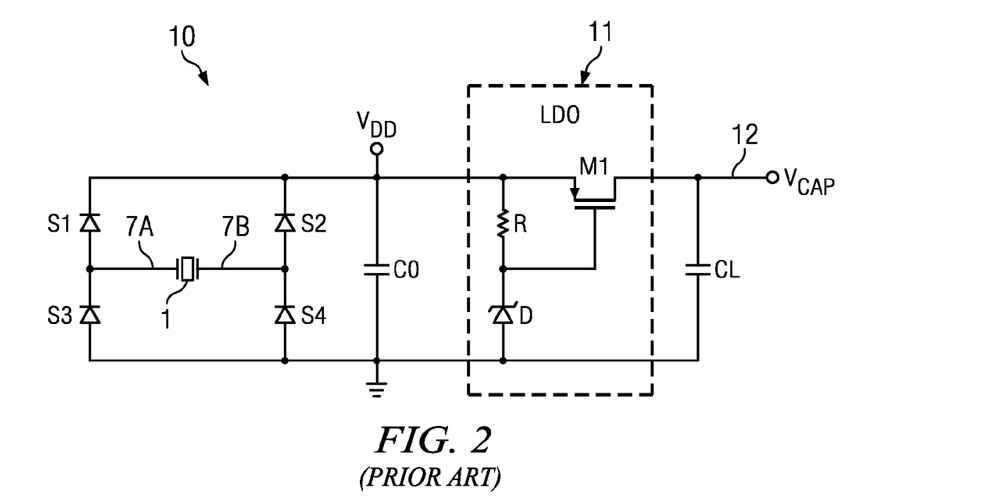
FIG. 2 is a schematic diagram of a prior art power management circuit for an induction harvester as shown in FIG. 1.

A known power management circuit 10 including an induction-type energy harvester 1 is shown in FIG. 2. Power management circuit 10 also includes a rectifier and a low dropout (LDO) regulator. A passive rectifier including diodes S1, S2, S3, and S4 rectifies the AC output signal produced between terminals 7A and 7B by inductive energy harvester 1. A cathode of diode S1 is connected to $V_{DD}$ and its anode is connected by terminal 7A to the cathode of diode S3, the anode of which is connected to ground. The cathode of diode S2 is connected to conductor 18. The anode of diode S2 is connected by terminal 7B to the cathode of diode S4, the anode of which is connected to ground. A filter capacitor C0 is connected between $V_{DD}$ and ground. A DC-DC converter, such as LDO regulator 11, is connected between $V_{DD}$ and ground to produce a regulated output voltage $V_{CAP}$ on output conductor 12. A load capacitor $C_L$ is connected between output conductor 12 and ground. LDO 11 includes a P-channel transistor M1 connected between $V_{DD}$ and output conductor 12. A resistor R is connected between $V_{DD}$ and the cathode of a zener diode D, the anode of which is connected to ground. The junction between resistor R and zener diode D is connected to the gate of transistor M1.

The output impedance of induction energy harvester 1 and the input capacitance of the energy storage circuitry forms a resistor-capacitor network that typically has a time constant of roughly 20 seconds which determines how quickly the voltage on the storage capacitor $C_L$ rises. Consequently, at low vibration levels it may take several minutes before there is sufficient energy to acquire a vibration spectra and transmit it. To avoid this problem, resistor R2, zener diode D5 and transistor M1 all of LDO regulator 11 in FIG. 2 isolate the large storage capacitor $C_L$ from C0. This allows the voltage $V_{DD}$ to establish itself much faster, e.g., 30 times faster.

Induction harvester power management system 10 of FIG. 2 has the shortcoming that its harvesting efficiency is low due to losses in the rectifier diodes. Another shortcoming is that it does not allow any energy at all to be harvested at very low vibration levels (for example, when $V_{DD}<V_{CAP}$) because it does not develop enough voltage to adequately charge filter capacitor C0.

Figure 3A:
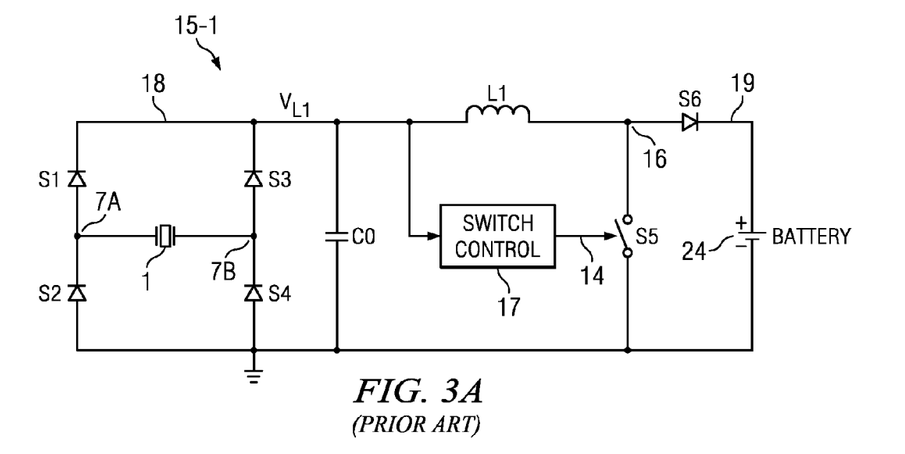
FIG. 3A is a simplified schematic diagram of a prior art power management circuit including a vibration micro harvester and a boost converter.
Figure 3B:
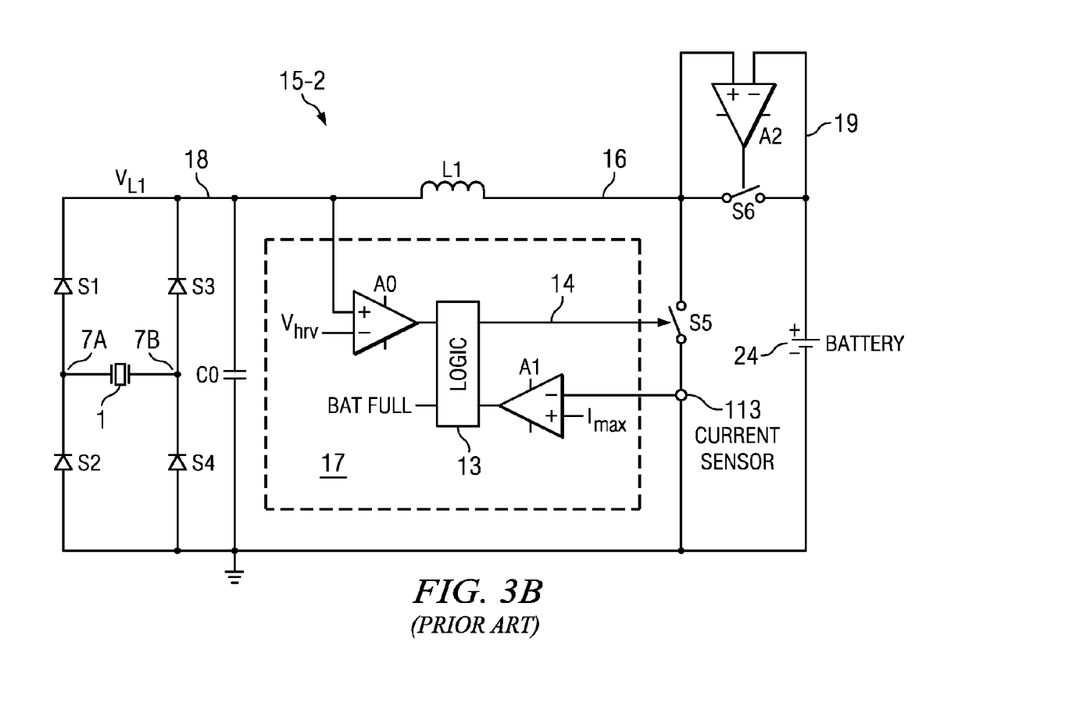
FIG. 3B is a more detailed schematic diagram of the prior art power management circuit in FIG. 3A.

The efficiency of power management system 10 in Prior Art FIG. 2 can be improved by using a DC-DC converter including an inductor, and low-vibration-level harvesting capability can be improved by choosing a DC-DC converter of the boost type as shown in Prior Art FIGS. 3A and 3B.

In FIG. 3A, prior art power management circuit 15-1 includes an inductive energy harvester 1, for example as shown in FIG. 1. A passive rectifier including diodes S1, S2, S3, and S4 rectifies the AC output signal produced by inductive energy harvester 1 between its terminals 7A and 7B. A cathode of diode S1 is connected to conductor 18, and its anode is connected by conductor 7A to the cathode of diode S2, the anode of which is connected to ground. The cathode of diode S3 is connected to conductor 18. The anode of diode S3 is connected by conductor 7B to the cathode of diode S4, the anode of which is connected to ground. A filter capacitor C0 is connected between conductor 18 and ground.

Power management circuit 15-1 also includes a boost converter circuit including inductor L1, a switch S5, a diode S6, and a switch control circuit 17. A first terminal of inductor L1 is connected to receive a rectified voltage $V_{L1}$ produced on conductor 18 by energy harvester 1 and the passive rectifier S1,2,3,4. $V_{L1}$ is also applied to an input of switch control circuit 17. The other terminal of inductor L1 is connected by conductor 16 to one terminal of switch S5 and to the anode of diode S6. The other terminal of switch S5 is connected to ground. The control electrode of switch S5 is connected by conductor 14 to an output of switch control circuit 17.

FIG. 3B shows a more detailed implementation 15-2 of power management system 15-1 of FIG. 3A. In FIG. 3B, prior art power management system 15-2 includes inductive or vibration harvester 1 and passive rectifier S1, 2, 3, 4 connected as in FIG. 3A. Switch control circuit 17 in FIG. 3B includes a comparator A0 having its inverting input coupled to receive a threshold voltage $V_{hrv}$ and its non-inverting input connected to receive $V_{L1}$ on conductor 18 such that boosting operation of the DC-DC boost converter circuitry occurs when $V_{L1}$ exceeds $V_{hrv}$. The output of comparator A0 is connected to an input of a logic circuit 13. Another input of logic circuit 13 receives a "battery charged" or "battery full" input signal supplied by conventional voltage sensing circuitry. In FIG. 3B, the lower terminal of switch S5 is coupled to one terminal of a current sensor 113 a terminal of which is connected to ground. An output of current sensor 113 is connected to an inverting input of a comparator A1 which receives a reference threshold value $I_{max}$ on its non-inverting input. The output of comparator A1 is connected to another input of logic circuit 13. The output of logic circuit 13 is connected by conductor 14 to the control terminal of switch S5. Diode S6 as shown in FIG. 3A is implemented in FIG. 3B by means of a synchronous rectifier which includes switch S6 coupled between output conductor 19 and conductor 16, with its control terminal coupled to the output of a comparator A2 having its inverting input connected to output conductor 19 and its non-inverting input connected to inductor terminal 16.

The power management system of Prior Art FIGS. 3A and 3B replaces the LDO regulator in prior art FIG. 2 with a boost converter. The power management systems 15-1 and 15-2 of FIGS. 3A and 3B require an inductor (L1), which typically would be a large, expensive, external component. The system of FIGS. 3A and 3B also has the shortcoming of excessive voltage and power loss in the 4 diodes of the passive rectifier S1, 2, 3, 4, and (3). Furthermore, another DC-DC converter or LDO regulator would be required between the battery and load in order to provide a regulated supply voltage.

The relevant prior art is believed to also include commonly assigned U.S. Pat. No. 6,275,016 entitled "Buck-Boost Switching Regulator" issued Aug. 14, 2001 to Vadim V. Ivanov and incorporated herein by reference.

Thus, there is an unmet need for a way to avoid the high cost of the coil or inductor usually required in a DC-DC converter utilized for conversion of the AC output generated by an induction energy harvester.

There also is an unmet need for an inductive energy harvesting device which is more efficient than those available in the prior art and which avoids voltage losses in rectifier diodes.

There also is an unmet need for an inductive energy harvesting device which is more efficient than those available in the prior art and which is capable of efficient harvesting of very low AC voltage levels produced by relative movement between a coil and a magnet thereof in a low-vibration-level environment.

There also is an unmet need for an inductive energy harvesting device which is more efficient and effective than those available in the prior art and which avoids voltage losses in rectifier diodes in prior art inductive energy harvesting devices and which is capable of more efficient harvesting of very low AC voltage levels produced by relative movement between a coil and a magnet thereof in a low-vibration-level environment than has been achievable in the prior art.

SUMMARY OF THE INVENTION

It is an object of the invention to provide a way to avoid the high cost of the coil or inductor usually required in a DC-DC converter utilized for conversion of the AC output generated by an induction energy harvester.

It is another object of the invention to provide an inductive energy harvesting device which is more efficient than those available in the prior art and which avoids voltage losses in rectifier diodes.

It is another object of the invention to provide an inductive energy harvesting device which is more efficient than those available in the prior art and which is capable of efficient harvesting of very low AC voltage levels produced by relative movement between a coil and a magnet thereof in a low-vibration-level environment.

It is another object of the invention to provide an inductive energy harvesting device which is more efficient and effective than those available in the prior art and which avoids voltage losses in rectifier diodes in prior art inductive energy harvesting devices and which is capable of more efficient harvesting of very low AC voltage levels produced by relative movement between a coil and a magnet thereof in a low-vibration-level environment than has been achievable in the prior art.

Briefly described, and in accordance with one embodiment, the present invention provides a system for managing AC energy harvested from a harvesting device (1), the system including a coil (4) including switching circuitry (S1-S4) coupled between first (7A) and second (7B) terminals of the coil (4). The switching circuitry includes first (S1), second (S2), third (S1), and fourth (S4) switches. A switch controller (17) closes the second and fourth switches to allow build-up of current ($I_{Lh}$) in the coil, opens one of the second and fourth switches, and closes a corresponding one of the third and first switches in response to the built-up inductor current reaching a predetermined threshold value ($I_{hrv}$) to steer the built-up inductor current through the corresponding one of the third and first switches to a current-receiving device (24 and/or $R_L$, $C_L$).

In one embodiment, the invention provides a system (15-3,4,5) for managing AC energy harvested from a harvesting device (1) including a coil (4), the system including rectifying circuitry (S1-S4) coupled between first (7A) and second (7B) terminals of the harvesting device (1). The rectifying circuitry (S1-S4) includes a first switching device (S1) having a first electrode coupled to an output conductor (18) for conducting a rectified voltage ($V_{Lh}$) and a second electrode coupled to a first terminal (7A) of the coil (4), a second switching device (S2) having a first electrode coupled to the first terminal (7A) of the coil (4) and a second electrode coupled to a reference voltage (GND), a third switching device (S3) having a first electrode coupled to the output conductor (18) and a second electrode coupled to a second terminal (7B) of the coil (4), and a fourth switching device (S4) having a first electrode coupled to the second terminal (7B) of the coil (4) and a second electrode coupled to the reference voltage (GND). DC converting circuitry for converting the rectified voltage ($V_{Lh}$) includes switch control circuitry (17) having first and second inputs coupled to the first (7A) and second (7B) terminals, respectively, of the coil (4), and first (20-1), second (20-2), third (20-3), and fourth (20-4) outputs coupled to control electrodes of the first (S1), second (S2), third (S3), and fourth (S4) switching devices, respectively. The DC converting circuitry converts a rectified voltage ($V_{Lh}$) by closing the second (S2) and fourth (S4) switching devices to allow build-up of current ($I_{Lh}$) in the coil (4), opening one of the second (S2) and fourth (S4) switching devices, and closing a corresponding one of the third (S3) and first (S1) switching devices in response to the built-up inductor current ($I_{Lh}$) reaching a predetermined threshold value ($I_{hrv}$) to steer the built-up inductor current ($I_{Lh}$) through the corresponding one of the third (S3) and first (S1) switching devices to a current-receiving device (24 and/or $R_L$, $C_L$).

In a described embodiment, the DC converting circuitry functions to step up the rectified voltage ($V_{Lh}$). In another described embodiment, the DC converting circuitry functions to step down the rectified voltage ($V_{Lh}$).

In a described embodiment, the switch control circuitry (17) includes a first comparator (A1) having an inverting input coupled to the reference voltage (GND), a non-inverting input coupled to the second terminal (7B) of the coil (4), and an output (20-2) coupled to control the first (S1) and second (S2) switching devices. In one embodiment, the switch control circuitry (17) includes a first inverter (22) having an output coupled to the control electrode (20-1) of the first switching device (S1), a second comparator (A0) having an inverting input coupled to the reference voltage (GND), a non-inverting input coupled to the first terminal (7A) of the coil (4), and an output (20-4) coupled to control the fourth (S4) and third (S3) switching devices, and a second inverter (23) having an output coupled to the control electrode (20-3) of the third switching device (S3). The fourth switching device (S4) has an on resistance ($R_{ON}$) that causes a first voltage ($V_4$) to be generated on the second terminal (7B) when the current ($I_{Lh}$) in the coil (4) flows from the coil through the fourth switching device (S4), and wherein the second switching device (S2) has an on resistance ($R_{ON}$) that causes a second voltage ($V_2$) to be generated on the first terminal (7A) when the current ($I_{Lh}$) in the coil (4) flows from the coil through the second switching device (S2).

In one embodiment, the first comparator (A1) changes state when the current ($I_{Lh}$) in the coil (4) has built up enough in a first direction to cause the first voltage ($V_4$) to exceed a first threshold of the first comparator (A1) causing it to change state so as to open the fourth switching device (S4) and close the third switching device (S3) to steer the current ($I_{Lh}$) in the coil (4) through the third switch (S3) into the output conductor (18). The first comparator (A1) changes state again when the current ($I_{Lh}$) in the coil (4) decreases enough to cause the first voltage ($V_4$) to fall below a second threshold of the first comparator (A1) causing it to change state so as to close the fourth switching device (S4) and open the third switching device (S3) to allow build-up of current ($I_{Lh}$) in a second direction through the coil (4). The second comparator (A0) changes state when the current ($I_{Lh}$) in the coil (4) has built up enough in the second direction to cause the second voltage ($V_2$) to exceed a first threshold of the second comparator (A0) causing it to change state so as to open the second switching device (S2) and close the first switching device (S1) to steer the current ($I_{Lh}$) in the coil (4) through the first switch (S1) into the output conductor (18). The second comparator (A0) changes state again when the current (6) in the coil (4) decreases enough to cause the second voltage ($V_2$) to fall below a second threshold of the second comparator (A0) causing it to change state so as to close the second switching device (S2) and open the third switching device (S1) to allow build-up of current ($I_{Lh}$) in the first direction through the coil (4).

In one embodiment, a load ($R_L$,$C_L$) is coupled to a load conductor (35) for conducting a load voltage ($V_{LOAD}$). A fifth switching device (S5) has a first electrode coupled to the first terminal (7A) of the coil (4), a second electrode coupled to the load conductor (35), and a control electrode coupled to the switch control circuitry (17,17A). A sixth switching device (S6) has a first electrode coupled to the second terminal (7B) of the coil (4), a second electrode coupled to the load conductor (35), and a control electrode coupled to the switch control circuitry (17A). The switch control circuitry (17A) operates to close one or the other of the fifth (S5) and sixth (S6) switching devices to transfer energy from the battery (24) to the load ($R_L$, $C_L$) if a load voltage ($V_{LOAD}$) required by the load ($R_L$, $C_L$) is below the battery voltage ($V_{BAT}$).

In one embodiment, a load ($R_L$, $C_L$) is coupled to a load conductor (35) for conducting a load voltage ($V_{LOAD}$). A fifth switching device (S5) has a first electrode coupled to the first terminal (7A) of the coil (4), a second electrode coupled to the load conductor (35), and a control electrode coupled to the switch control circuitry (17A). A sixth switching device (S6) has a first electrode coupled to the second terminal (7B) of the coil (4), a second electrode coupled to the load conductor (35), and a control electrode coupled to the switch control circuitry (17A). The switch control circuitry (17) operates to close one or the other of the fifth (S5) and sixth (S6) switching devices if energy is available in the coil (4) to transfer energy from the coil (4) to the load ($R_L$, $C_L$).

In one embodiment, the switch control circuitry (17A) operates to configure the coil (4) and the first (S1), second (S2), third (S3) and fourth (S4) switching devices as a boost converter if the required load voltage ($V_{LOAD}$) exceeds the battery voltage ($V_{BAT}$) and as a buck converter if the required load voltage ($V_{LOAD}$) is less than the battery voltage ($V_{BAT}$).

In one embodiment, the invention provides a method for managing AC energy harvested from a harvesting device (1) including a coil (4), the method including providing switching circuitry (S1-S4) coupled between first (7A) and second (7B) terminals of the coil (4), the switching circuitry (S1-S4) including first (S1), second (S2), third (S1), and fourth (S4) switching devices; closing the second (S2) and fourth (S4) switching devices to allow build-up of current ($I_{Lh}$) in the coil (4); and opening one of the second (S2) and fourth (S4) switching devices and closing a corresponding one of the third (S3) and first (S1) switching devices in response to the built-up inductor current ($I_{Lh}$) reaching a predetermined threshold value ($I_{hrv}$) to steer the built-up inductor current ($I_{Lh}$) through the corresponding one of the third (S3) and first (S1) switching devices to a current-receiving device (24 and/or $R_L$, $C_L$).

In one embodiment, the method includes coupling a load ($R_L$, $C_L$) to a load conductor (35) for conducting a load voltage ($V_{LOAD}$), coupling a fifth switching device (S5) between the first terminal (7A) of the coil (4) and the load conductor (35), coupling a sixth switching device (S6) between the second terminal (7B) of the coil (4) and the load conductor (35), and operating the switch control circuitry (17A) to close one of the fifth (S5) and sixth (S6) switching devices to transfer energy from the battery (24) to the load ($R_L$, $C_L$) if a load voltage ($V_{LOAD}$) required by the load ($R_L$, $C_L$) is below the battery voltage ($V_{BAT}$).

In one embodiment, the method includes operating the switch control circuitry (17A) to configure the coil (4) and the first (S1), second (S2), third (S3) and fourth (S4) switching devices as a boost converter if the required load voltage ($V_{LOAD}$) exceeds the battery voltage ($V_{BAT}$) and as a buck converter if the required load voltage ($V_{LOAD}$) is less than the battery voltage ($V_{BAT}$).

In one embodiment, the method includes coupling a load ($R_L$, $C_L$) to a load conductor (35) for conducting a load voltage ($V_{LOAD}$), coupling a fifth switching device (S5) between the first terminal (7A) of the coil (4) and the load conductor (35), coupling a sixth switching device (S6) between the second terminal (7B) of the coil (4) and the load conductor (35), and operating the switch control circuitry (17A) to close one or the other of the fifth (S5) and sixth (S6) switching devices to transfer energy from the battery (24) to the load ($R_L$,$C_L$) if energy is available in the coil (4) to transfer energy from the coil (4) to the load ($R_L$, $C_L$).

In one embodiment, the invention provides a system for managing AC energy harvested from a harvesting device (1), the system including a coil (4), including active rectifying circuitry (S1-S4) coupled between first (7A) and second (7B) terminals of the harvesting device (1), the rectifying circuitry (S1-S4) including first (S1), second (S2), third (S1), and fourth (S4) switching devices; means (17) for closing the second (S2) and fourth (S4) switching devices to allow build-up of current ($I_{Lh}$) in the coil (4); and means (17) for opening one of the second (S2) and fourth (S4) switching devices and closing a corresponding one of the third (S3) and first (S1) switching devices in response to the built-up inductor current ($I_{Lh}$) reaching a predetermined threshold value ($I_{hrv}$) to steer the built-up inductor current ($I_{Lh}$) through the corresponding one of the third (S3) and first (S1) switching devices to a current-receiving device (24 and/or $R_L$, $C_L$).

DETAILED DESCRIPTION OF THE PREFERRED EMBODIMENTS

Figure 4A:
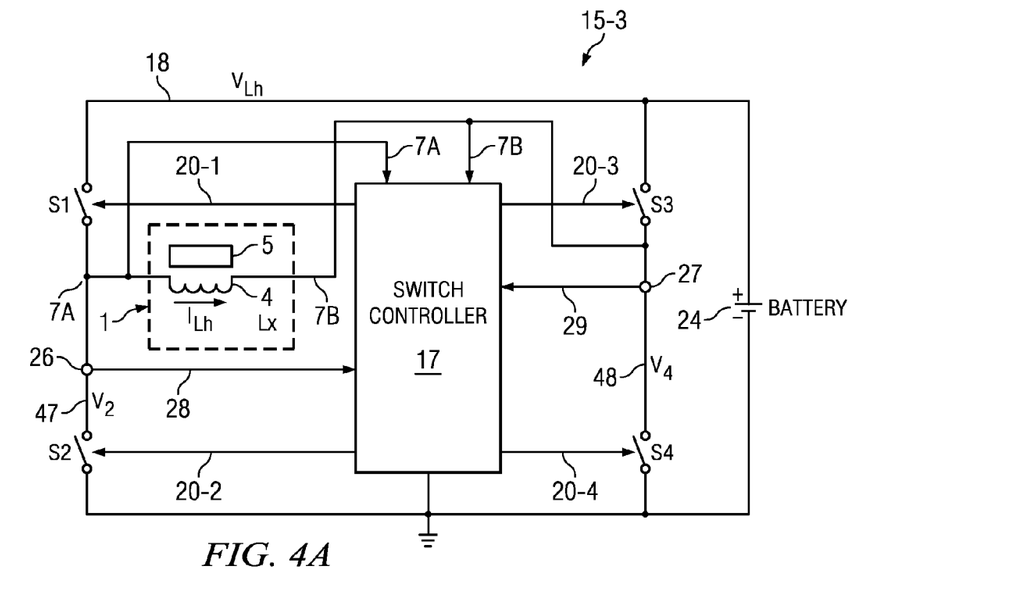
FIG. 4A is a block diagram of an inductive harvested power management circuit of the present invention.
Figure 4B:
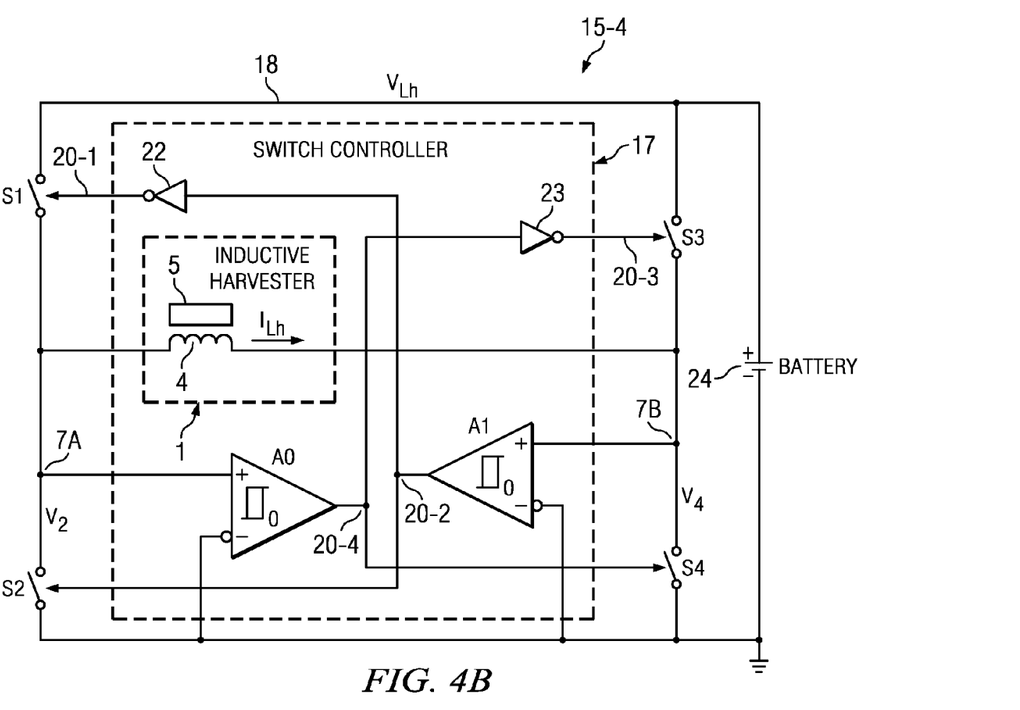
FIG. 4B is a schematic diagram of the inductive harvester power management circuit of FIG. 4A.

The first two previously mentioned problems of the system of Prior Art FIGS. 3A and 3B (i.e., the requirement of a large inductor in a DC-DC converter & loss of excessive voltage and power across passive rectifier diodes) can be solved by providing an active rectifier including synchronous switches in place of diodes S1,2,3,4 and also including a switch controller of the kind shown in FIGS. 4A and 4B.

Referring to FIG. 4A, power management system 15-3 includes switch S1 coupled between conductor 18 and terminal 7A of coil 4, also referred to as inductor 4. Terminal 7A of inductor 4 also is connected to a terminal of current sensor 26 and an input of switch controller 17. The output of current sensor 26 is connected by conductor 28 to another input of switch controller 17.

Switch S2 is coupled between another terminal 47 of current sensor 26 and ground. Similarly, switch S3 is coupled between conductor 18 and terminal 7B of inductor 4. Terminal 7B of inductor 4 is also connected to one terminal of current sensor 27 and another input of switch controller 17. An output of current sensor 27 is connected by conductor 29 to another input of switch controller 17 and a terminal 48 of switch S4, another terminal of which is connected to ground. A low-side supply voltage terminal of switch controller 17 is connected to ground. A high-side supply voltage terminal (not shown) of switch controller 17 may be connected to conductor 18 or other available power source.

Switch controller 17 receives the voltages $V_2$ and $V_4$ on inductor terminals 7A and 7B, respectively, and also receives the current sensor output signals on conductors 28 and 29, and accordingly controls switches S1, S2, S3, and S4 by means of control signals on conductors 20-1, 20-2, 20-3, and 20-4, respectively. A rectified voltage $V_{Lh}$ is generated on conductor 18 and applied to a battery or a load (not shown). Switches S1, S2, S3 and S4 are controlled by switch controller 17 so as to function as synchronous rectifiers. (A typical synchronous rectifier includes a switch having its two main terminals connected, respectively, to the inputs of a comparator, the output of which is connected to the control terminal of the switch.)

Switch controller 17 also determines the operation of switches S1-S4 so as to control transfer of the harvested AC current $I_{Lh}$ to produce the rectified DC output voltage $V_{Lh}$ to charge battery 24 or provide current to a load device. First, one of the switches S2 and S4 is closed to allow buildup-up of voltage (electromotive force) across coil 4 in response to vibration that moves coil 4 relative to magnet 5. This voltage $V_{Lh}$ then is measured. Then the switch S2 or S4 opposite to the open one of switches S2 and S4 is closed and causes build-up of current 6 through coil 4. By switching 51 on and S2 off or S2 on and S4 off, the built-up inductor current $I_{Lh}$ is steered to conductor 18 and battery 24 or a load device.

An alternative way of regulation is to keep both of switches S2 and S4 on (i.e., closed) and measuring the inductor current $I_{Lh}$ through flowing them by means of current sensor 26 or current sensor 27. When $I_{Lh}$ reaches a maximum or predetermined value it is steered to battery 24 by switching the S1/S2 switch pair or the S3/S4 switch pair (i.e., by turning S2 off and S1 on or by turning S4 off and S3 on), depending on the direction of inductor current $I_{Lh}$.

When inductor current $I_{Lh}$ falls to zero or other predetermined value, switch controller 17 stops toggling and returns to operation with one of switches S2 and S4 turned on. The process is repeated to allow buildup-up of voltage in the same or opposite direction, depending on vibration amplitude and control mode, in response to the ambient vibration and then to steer inductor current $I_{Lh}$ to battery 25 through the appropriate one of switches S3 or S1.

In FIG. 4A, switch controller 17 can be designed to operate in a voltage mode or a current mode. In the voltage mode, the voltage (i.e., the electromotive force) mentioned above across inductor 4 is given by $e_L=-wBv$, where w is number of turns, B is the density of the magnetic field and v is speed of coil 4 relative to magnet 5. Switch controller 17 closes one of switches S2 and S4 depending on the polarity of the voltage $e_L$. When the voltage $V_2$ or $V_4$ reaches a peak or predetermined value (e.g., close to the battery voltage), switch controller 17 starts to toggle the switch opposite to the closed switch S2 or S4. When both of switches S2 and S4 are closed, the inductor current $I_{Lh}$ starts to rise according to $dI_{Lh}/dt=e_L/L_1$, $L_1$ being the inductance of coil 4. When one of switches S2 and S4 is off, the inductor current $I_{Lh}$ flows through the other of those two switches, for example, switch S2, and also through switch S3, to battery 24. During this time inductor current $I_{Lh}$ decreases according to $dI_{Lh}/dt=-(V_{BAT}-e_L)/L_1$, $V_{BAT}$ being the voltage of battery 24.

In the voltage mode, voltage $V_2$ or $V_4$ is being measured, and when one of them reaches a predetermined threshold level or a peak level due to the flow of inductor current $I_{Lh}$ through one of switches S2 and S4, switch controller 17 toggles one of switches S1 and S3, depending on the polarity of inductor current $I_{Lh}$ in coil 4, so as to transfer energy from coil 4 to battery 24 or a load.

In the above mentioned current mode, both switches S2 and S4 are on. Movement of the short-circuited coil 4 through the field of magnet 5 generates current $I_{Lh}=\int e_L dt$ in inductor 4. When inductor current $I_{Lh}$ reaches its peak or predetermined value, switch controller 17 toggles one of switches S1 and S3, depending on polarity of inductor current $I_{Lh}$ thereby transferring inductor energy $E_{Lh}=(L_1 I_{Lh}^2)/2$ from coil 4 to battery 24 or a load.

FIG. 4B shows another implementation 15-4 of power management system 15-3 in FIG. 4A. In FIG. 4B, switches 51, S2, S3, and S4 are connected generally as shown in FIG. 4A except that current sensors 26 and 27 are omitted and details of switch controller 17 are shown. Switch controller 17 includes an inverter 22 having its output connected to the control terminal of switch S1 by conductor 20-1. The input of inverter 22 is connected by conductor 20-2 to the control terminal of switch S2 and the output of a hysteresis comparator A1 having its inverting input connected to ground. The non-inverting input of comparator A1 is connected to inductor terminal 7B. An inverter 23 has its output connected by conductor 20-3 to the control terminal of switch S3. The input of inverter 23 is connected by conductor 20-4 to the control terminal of switch S4 and the output of a hysteresis comparator A0. The inverting input of comparator A0 is connected to ground, and its non-inverting input is connected to inductor terminal 7A. Each of comparators A0 and A1 may be a conventional hysteretic (i.e., hysteresis) comparator. A battery (and/or load) is connected between conductor 18 and ground.

Figure 4C:
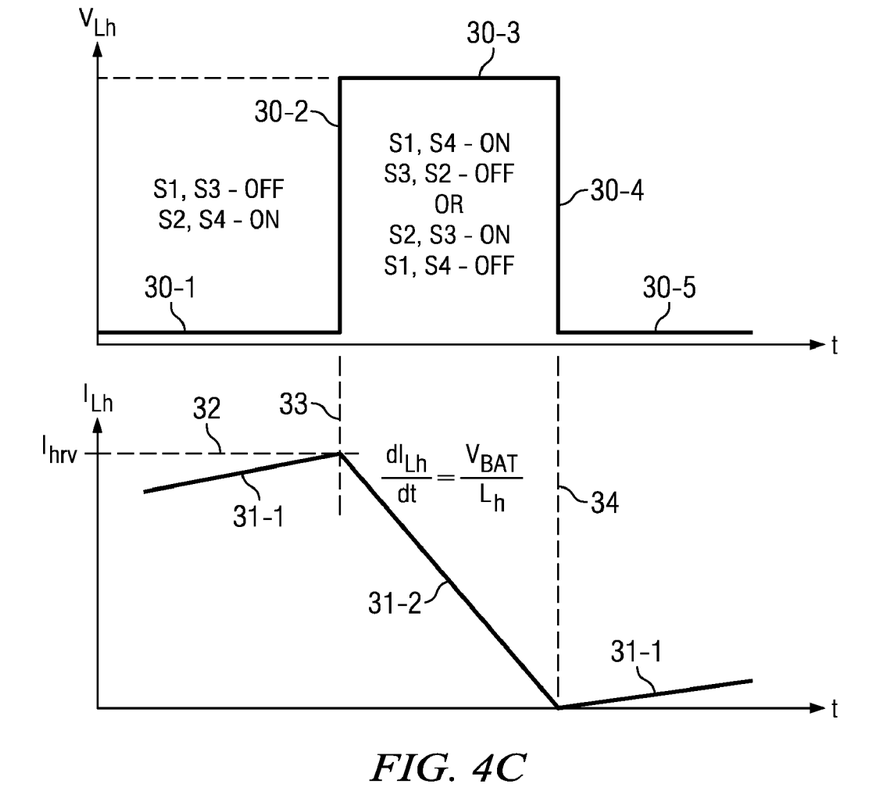
FIG. 4C is a graph useful in explaining the operation of the circuit shown in FIG. 4B.

Initially, switch controller 17 in FIG. 4B closes switches S2 and S4 to short-circuit both of coil terminals 7A and 7B to ground to thereby short-circuit coil 4 so that kinetic energy of vibration is transformed into magnetic energy in inductor 4. Voltage drops across the "on" resistances of switches S1-4 are proportional to the currents therein, and hysteretic comparators A0 and A1 change state when the magnitude of the inductor current $I_{Lh}$ indicated by segment 31-1 in FIG. 4C reaches the threshold value $I_{hrv}$ indicated by dotted line 32, and then drops to zero as indicated by segment 31-2. Inductor current $I_{Lh}$ then starts increasing again, as indicated by the second segment 31-1 shown in FIG. 4C. The status of switches S1-S4 are also indicated in FIG. 4C for the different portions of the operation of power management system 15-3 in FIGS. 4A and 15-4 in FIG. 4B.

More specifically, switch controller 17 in FIG. 4B determines the operation of switches S1-S4 to control the synchronous rectifying of the harvested AC signal $I_{Lh}$ and the boosting and conversion thereof to DC output $V_{Lh}$ for charging battery 24 or a load device. When the magnitude of inductor current $I_{Lh}$ reaches threshold value $I_{hrv}$ (or $-I_{hrv}$), comparator A0 (or A1) turns switch S4 off and turns switch S3 on (or, comparator A1 turns switch S2 off and turns switch 51 on), and vibration energy initially stored in inductor 4 is transferred to the battery 24, as indicated by the waveform of the voltage $V_{Lh}$ applied via conductor 18 to battery 24 and also the waveform of the harvested conductor current 6 as shown in FIG. 4C.

For example, switches S2 and S4 are closed to allow buildup-up of inductor current $I_{Lh}$ in response to vibration that moves coil 4 relative to magnet 5. For the inductor current direction shown in FIG. 4B, the built-up inductor current $I_{Lh}$ then is in effect measured by the value of the voltage $V_4$ it generates across the "on" resistance $R_{ON}$ of switch S4. When $V_4$ exceeds a first threshold of comparator A1, it changes state. That causes switch S4 to open, and also causes inverter 23 to cause corresponding switch S3 to close, thereby steering the built-up inductor current $I_{Lh}$ through conductor 18 into battery 24. As the inductor current $I_{Lh}$ flows into battery 24 its value gradually falls to zero and in effect resets window comparator A1 so that switch S3 is opened and switch S4 is closed. This allows buildup-up of inductor current $I_{Lh}$ in the opposite or negative direction in response to the ambient vibration.

The built-up inductor current $I_{Lh}$ in the negative direction then is in effect measured by the value of the voltage $V_2$ generated across the "on" resistance $R_{ON}$ of switch S2 by inductor current $I_{Lh}$. When voltage $V_2$ exceeds a first threshold of comparator A0 it changes state. That causes switch controller 17 to open switch S2, and also causes inverter 22 to close switch S1 to thereby steer the built-up negative-direction inductor current $I_{Lh}$ through conductor 18 into battery 24 (and/or a load). As the negative-direction inductor current $I_{Lh}$ flows into battery 24 its value gradually falls to zero and in effect resets window comparator A0 so that switch S1 is opened and low-side switch S2 is closed.

The foregoing process is repeated as long as adequate ambient vibrations continue.

The value of $I_{hrv}$ preferably is adjustable and determined by the derivative of the harvested current $I_{hrv}$ in coil 4. In order to minimize dynamic losses, energy transfer should happen only when current in coil 4 is at its maximum absolute value or its minimum absolute value. The minimum value of $I_{hrv}$ in the graph of FIG. 4C corresponds to the smallest harvestable energy. The smallest harvestable energy $I_{hrv}$ should be significantly larger than the amount of switching losses in switches, comparators, the inductor, etc. Comparators A0 and A1 can function with very low voltage input signals (e.g., tens of millivolts). To achieve the required operating speed with the small amount of overdrive available from such low voltage input signals, the current consumption of comparators A0 and A1 would necessarily be excessive.

Figure 5A:
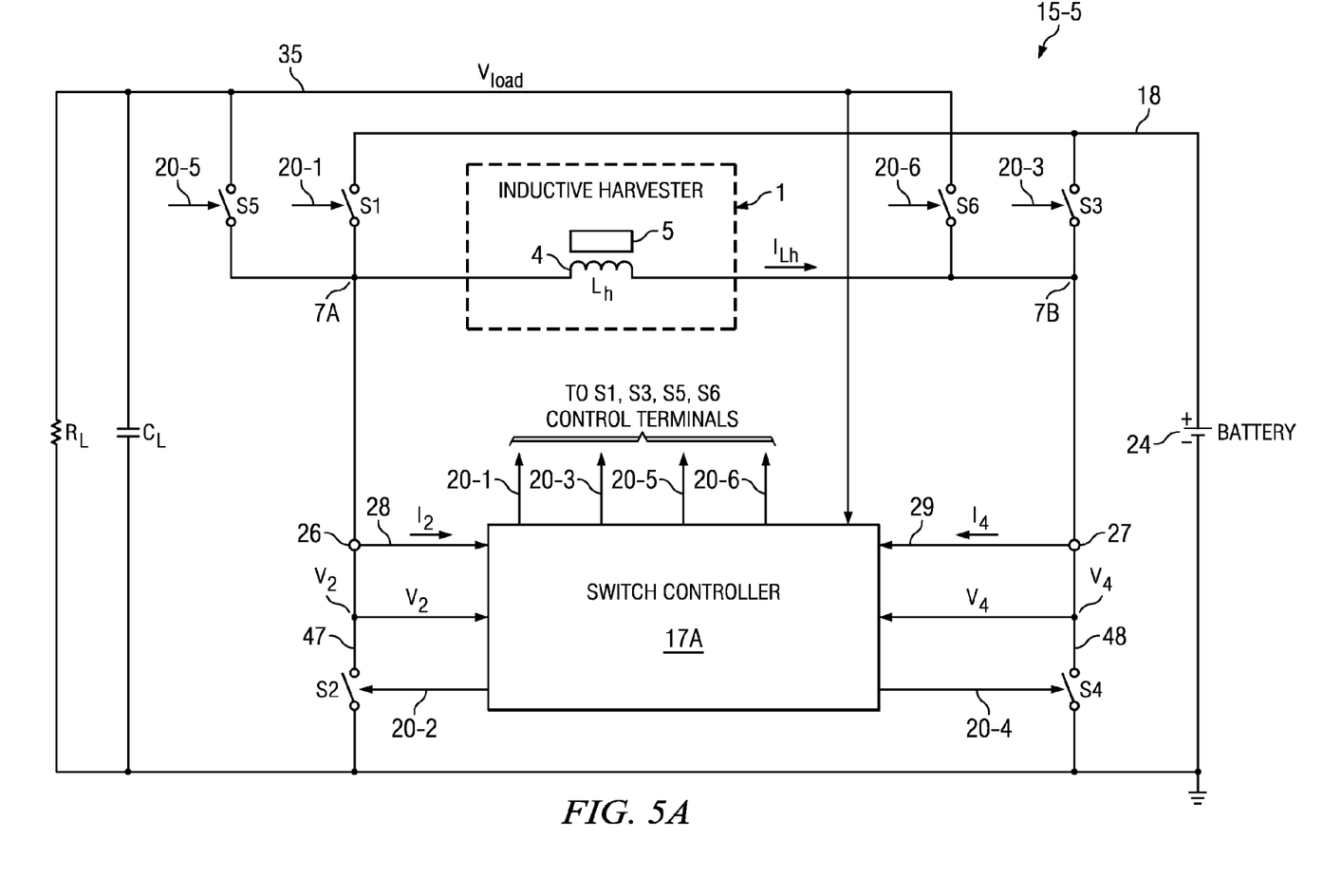
FIG. 5A is a schematic diagram of another inductive harvester power management circuit of the present invention.

In order to decrease idle or standby power when ambient vibrations the energy of which is being harvested are small such that $I_{Lh} \ll I_h$, the structure of FIG. 5A can be used. In FIG. 5A, comparators A0 and A1 are disabled at the beginning of the AC harvested current cycle and switches S1, S2, and S3 are off (i.e., open).

In FIG. 5A, current sensors 26 and 27 may be used because for some applications there is a need to not only sometimes charge battery 24, but there also is a need to sometimes supply and regulate the voltage $V_{LOAD}$ supplied to a load including load resistor $R_L$ and load capacitor $C_L$. In this case, switches S5 and S6 are added to the structure of FIG. 4A in order to achieve both the charging and regulating tasks. Switch S5 is connected between inductor terminal 7A and conductor 35, which conducts a load voltage $V_{LOAD}$ applied to a load including load resistor $R_L$ and load capacitor $C_L$. The control terminal of switch S5 is connected by conductor 20-5 to switch control circuit 17A. Similarly, switch S6 is connected between inductor terminal 7B and conductor 35. The control terminal of switch S6 is connected by conductor 20-6 to switch control circuit 17A.

When it is necessary to charge battery 24, the circuit 15-5 of FIG. 5A can operate exactly like the previously described circuit 15-4 of FIG. 4A or FIG. 4B.

However, when it is necessary to operate the load $R_L, C_L$, switch controller 17A operates to toggle switch S5 or S6 instead of switch S1 or switch S3. Then the energy from inductor 4 is transferred to load $R_L, C_L$ instead of to battery 24. If there presently is no energy in inductor 4, for example because no energy is presently being harvested, then by using energy from charged up battery 24, switch controller 17A can operate to configure inductor 4 and switches S1-4 as a buck converter or boost converter, depending on whether $V_{BAT}$ is greater than or less than the voltage $V_{load}$ required by load $R_L$, $C_L$. (More information on controlling buck/boost converter circuitry is presented in above mentioned commonly owned U.S. Pat. No. 6,275,016.)

As an example, if no energy is presently being harvested, then switch controller 17A can close switch S3 and toggle switches S5 and S2 such that these switches along with coil 4 are configured to operate as a boost converter if the required load voltage $V_{load}$ is greater than $V_{BAT}$. Or, switch controller 17A can close switch S5 and toggle switches S3 and S4 and then these switches and inductor 4 will be configured to operate as a buck converter, depending on whether the battery voltage or the voltage required by the load is larger.

If harvested energy is available, switch controller 17A can channel the harvested energy to load $R_L, C_L$ instead of battery 24 through switch S5 or S6 when toggling the S2/S4 or S1/S3 switch pair as previously described.

In any case, the inductance L1 of harvester coil 4 is in effect time-shared between energy harvester 1 and the portion of FIG. 5A that functions as a DC-DC converter. This avoids the high cost of providing the usual inductor for a boost converter or buck converter.

Figure 5B:
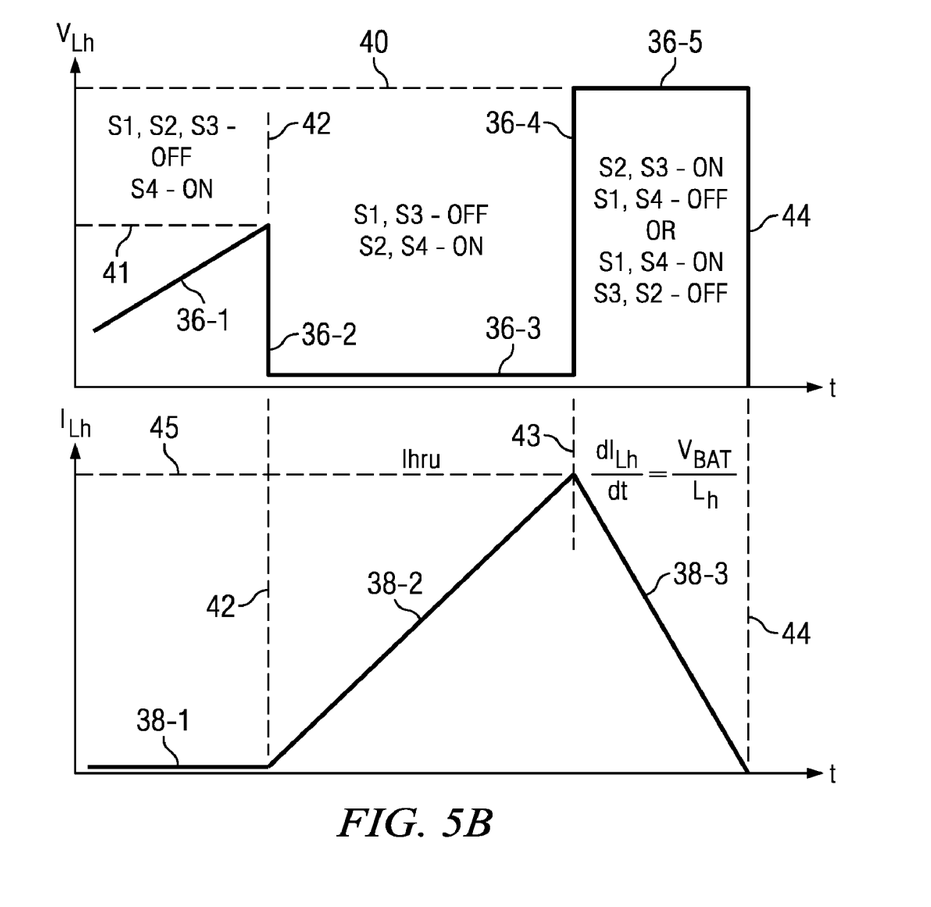
FIG. 5B is a graph useful in explaining the operation of the circuit shown in FIG. 5A.

Coil current ($I_{Lh}$) and output voltage ($V_{Lh}$) waveforms are shown in FIG. 5B. The status of switches S1-S4 are also indicated in FIG. 5B for the different portions of the operation of power management system 15-4 in FIG. 5A.

Thus, the invention uses various switches so as to utilize the inductor 4 of energy harvester 1 for generating the harvested AC signal $I_{Lh}$ so as to achieve high-efficiency synchronous rectifying and also for DC-DC conversion of $I_{Lh}$. This avoids the expense of providing an external inductor for use only in the DC-DC conversion. This is in contrast to the prior art, which does require an additional external inductor for the DC-DC conversion.

While the invention has been described with reference to several particular embodiments thereof, those skilled in the art will be able to make various modifications to the described embodiments of the invention without departing from its true spirit and scope. It is intended all elements or steps which are insubstantially different from those recited in the claims but perform substantially the same functions, respectively, in substantially the same way to achieve the same result as what is claimed are within the scope of the invention.

What is claimed is:

1. A system for managing AC energy harvested from a harvesting device including a coil, the system comprising:
   rectifying circuitry coupled between first and second terminals of the harvesting device, the rectifying circuitry including a first switching device having a first electrode coupled to an output conductor for conducting a rectified voltage and a second electrode coupled to a first terminal of the coil, a second switching device having a first electrode coupled to the first terminal of the coil and a second electrode coupled to a reference voltage, a third switching device having a first electrode coupled to the output conductor and a second electrode coupled to a second terminal of the coil, and a fourth switching device having a first electrode coupled to the second terminal of the coil and a second electrode coupled to the reference voltage; and
   power management circuitry for converting the rectified voltage, including switch control circuitry having first and second inputs coupled to the first and second terminals, respectively, of the coil and first, second, third, and fourth outputs coupled to control electrodes of the first, second, third, and fourth switching devices, respectively, the switch control circuitry closing the second and fourth switching devices to allow build-up of current in the coil, opening one of the second and fourth switching devices, the switch control circuitry closing a corresponding one of the third and first switching devices in response to the built-up inductor current reaching a predetermined threshold value to steer the built-up inductor current through the corresponding one of the third and first switching devices to a current-receiving device.

2. The system of claim 1 wherein the power management circuitry functions to step up the rectified voltage.

3. The system of claim 1 wherein the power management circuitry functions to step down the rectified voltage.

4. The system of claim 1 wherein the switch control circuitry includes a first comparator having an inverting input coupled to the reference voltage, a non-inverting input coupled to the second terminal of the coil, and an output coupled to control the first and second switching devices.

5. The system of claim 4 wherein the switch control circuitry includes a first inverter having an output coupled to the control electrode of the first switching device, a second comparator having an inverting input coupled to the reference voltage, a non-inverting input coupled to the first terminal of the coil, and an output coupled to control the fourth and third switching devices, and a second inverter having an output coupled to the control electrode of the third switching device.

6. The system of claim 5 wherein the fourth switching device has an on resistance that causes a first voltage to be generated on the second terminal when the current in the coil flows from the coil through the fourth switching device, and wherein the second switching device has an on resistance that causes a second voltage to be generated on the first terminal when the current in the coil flows from the coil through the second switching device.

7. The system of claim 6 wherein the first comparator changes state when the current in the coil has built up enough in a first direction to cause the first voltage to exceed a first threshold of the first comparator causing it to change state so as to open the fourth switching device and close the third switching device to steer the current in the coil through the third switch into the output conductor.

8. The system of claim 7 wherein the first comparator changes state again when the current in the coil decreases enough to cause the first voltage to fall below a second threshold of the first comparator causing it to change state so as to close the fourth switching device and open the third switching device to allow build-up of current in a second direction through the coil.

9. The system of claim 7 wherein the second comparator changes state when the current in the coil has built up enough in the second direction to cause the second voltage to exceed a first threshold of the second comparator causing it to change state so as to open the second switching device and close the first switching device to steer the current in the coil through the first switch into the output conductor, and wherein the second comparator changes state again when the current in the coil decreases enough to cause the second voltage to fall below a second threshold of the second comparator causing it to change state so as to close the second switching device and open the third switching device to allow build-up of current in the first direction through the coil.

10. The system of claim 1 including
    a load coupled to a load conductor for conducting a load voltage,
    a fifth switching device having a first electrode coupled to the first terminal of the coil, a second electrode coupled to the load conductor, and a control electrode coupled to the switch control circuitry,
    a sixth switching device having a first electrode coupled to the second terminal of the coil, a second electrode coupled to the load conductor, and a control electrode coupled to the switch control circuitry, and
    the switch control circuitry operating to close one of the fifth and sixth switching devices and to close a corresponding one of the first and third switches, to transfer energy from a battery to the load if a load voltage required by the load is below the battery voltage.

11. The system of claim 10 wherein the switch control circuitry operates to configure the coil and the first, second, third and fourth switching devices as a boost converter if the required load voltage exceeds the battery voltage and as a buck converter if the required load voltage is less than the battery voltage.

12. The system of claim 1 including
    a load coupled to a load conductor for conducting a load voltage,
    a fifth switching device having a first electrode coupled to the first terminal of the coil, a second electrode coupled to the load conductor, and a control electrode coupled to the switch control circuitry,
    a sixth switching device having a first electrode coupled to the second terminal of the coil, a second electrode coupled to the load conductor, and a control electrode coupled to the switch control circuitry, and
    the switch control circuitry operating to close one of the fifth and sixth switching devices if energy is available in the coil, to transfer energy from the coil to the load.

13. The system of claim 1 wherein the harvesting device converts vibration energy to the harvested AC energy.

14. The system of claim 13 wherein the vibration energy has a frequency less than approximately 2000 Hz.

15. A method for managing AC energy harvested from a harvesting device including a coil, the method comprising:
providing switching circuitry coupled between first and second terminals of the harvesting device, the switching circuitry including first, second, third, and fourth switching devices;
closing at least one of the second and fourth switching devices to allow build-up of current in the coil; and
opening one of the second and fourth switching devices and closing a corresponding one of the third and first switching devices in response to the built-up inductor current reaching a predetermined threshold value to steer the built-up inductor current through the corresponding one of the third and first switching devices to a current-receiving device.

16. The method of claim 15 including
coupling a load to a load conductor for conducting a load voltage, coupling a fifth switching device between the first terminal of the coil and the load conductor, coupling a sixth switching device between the second terminal of the coil and the load conductor, and
operating the switch control circuitry to close one of the fifth and sixth switching devices to transfer energy from a battery to the load if a load voltage required by the load is below a voltage of the battery.

17. The method of claim 16 including operating the switch control circuitry to configure the coil and the first, second, third and fourth switching devices as a boost converter if the required load voltage exceeds the battery voltage and as a buck converter if the required load voltage is less than the battery voltage.

18. The method of claim 15 including
coupling a load to a load conductor for conducting a load voltage, coupling a fifth switching device between the first terminal of the coil and the load conductor, coupling a sixth switching device between the second terminal of the coil and the load conductor, and
operating the switch control circuitry to close one of the fifth and sixth switching devices to transfer energy from the battery to the load if energy is available in the coil to transfer energy from the coil to the load.

19. The method of claim 15 wherein the vibration energy has a frequency less than approximately 2000 Hz.

20. A system for managing AC energy harvested from a harvesting device including a coil, comprising:
switching circuitry coupled between first and second terminals of the harvesting device, the switching circuitry including first, second, third, and fourth switching devices;
means for closing the second and fourth switching devices to allow build-up of current in the coil; and
means for opening one of the second and fourth switching devices and closing a corresponding one of the third and first switching devices in response to the built-up inductor current reaching a predetermined threshold value to steer the built-up inductor current through the corresponding one of the third and first switching devices to a current-receiving device.

* * * * *